United States Patent
Maezawa

(10) Patent No.: US 10,908,402 B2
(45) Date of Patent: Feb. 2, 2021

(54) IMAGE PICKUP APPARATUS INCLUDING OPTICAL SYSTEM HAVING REFRACTIVE SURFACE AND REFLECTION SURFACE, AND ON-BOARD SYSTEM AND MOVING DEVICE PROVIDED WITH SAME

(71) Applicant: CANON KABUSHIKI KAISHA, Tokyo (JP)

(72) Inventor: Koji Maezawa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 156 days.

(21) Appl. No.: 16/198,239

(22) Filed: Nov. 21, 2018

(65) Prior Publication Data

US 2019/0162941 A1 May 30, 2019

(30) Foreign Application Priority Data

Nov. 30, 2017 (JP) .................................. 2017-230829

(51) Int. Cl.
| | | |
|---|---|---|
| *G02B 17/08* | (2006.01) | |
| *G02B 27/00* | (2006.01) | |
| *B60T 7/22* | (2006.01) | |

(52) U.S. Cl.
CPC ............ *G02B 17/086* (2013.01); *B60T 7/22* (2013.01); *G02B 17/0808* (2013.01); *G02B 17/0812* (2013.01); *G02B 17/0856* (2013.01); *G02B 27/0018* (2013.01); *B60T 2201/022* (2013.01)

(58) Field of Classification Search
CPC ............ G02B 17/086; G02B 17/0856; G02B 17/0812; G02B 27/0018; G02B 17/0808; B60T 7/22; B60T 2201/022; B60T 8/17
See application file for complete search history.

(56) References Cited

U.S. PATENT DOCUMENTS

| | | | | |
|---|---|---|---|---|
| 5,796,515 A | * | 8/1998 | Katsunuma | ........ G02B 17/0856 359/355 |
| 2012/0320187 A1 | * | 12/2012 | Katashiba | .......... G02B 17/0808 348/79 |
| 2013/0027603 A1 | * | 1/2013 | Maezawa | ........... G02B 17/0808 348/335 |

(Continued)

FOREIGN PATENT DOCUMENTS

JP 2004-361777 A 12/2004

*Primary Examiner* — Thomas Ingram
(74) *Attorney, Agent, or Firm* — Canon U.S.A., Inc. IP Division

(57) ABSTRACT

An image pickup apparatus including an optical system and an image pickup element. The optical system includes a first refractive surface disposed closest to an object, a first reflection surface, and a second reflection surface. A light receiving surface of the image pickup element is disposed at only one side with respect to the optical axis and at a position closer to the optical axis than an intersection between a straight line connecting an intersection on the first refractive surface and an intersection on an imaginary extension surface of the second reflection surface and an imaginary extension surface of the light receiving surface. Expression $1.5 \leq L2/L1 \leq 6.5$ is satisfied where L1 is an interval between the first reflection surface and the second reflection surface, and L2 is an interval between the first reflection surface and the light receiving surface.

19 Claims, 10 Drawing Sheets

(56) References Cited

U.S. PATENT DOCUMENTS

| | | | | |
|---|---|---|---|---|
| 2013/0033635 A1* | 2/2013 | Katashiba | .............. | G02B 21/04 348/335 |
| 2015/0168699 A1* | 6/2015 | Lee | .................... | G02B 17/0856 348/302 |
| 2020/0166738 A1* | 5/2020 | Khan | ..................... | G09G 3/003 |

* cited by examiner

IMAGE PICKUP APPARATUS INCLUDING OPTICAL SYSTEM HAVING REFRACTIVE SURFACE AND REFLECTION SURFACE, AND ON-BOARD SYSTEM AND MOVING DEVICE PROVIDED WITH SAME

BACKGROUND

Technical Field

The present disclosure relates to an image pickup apparatus including an optical system having a refractive surface and a reflection surface. The present disclosure is suitable for a digital still camera, a digital video camera, an on-board camera, a camera for a cellular phone, a monitoring camera, a wearable camera, and a medical camera, for example.

Description of the Related Art

A catadioptric system using a reflection surface and a refractive surface for size reduction has been known to be used as an optical system used in an image pickup apparatus. Japanese Patent Laid-Open No. 2004-361777 discloses a catadioptric system formed of optical elements including a plurality of refractive surfaces and a plurality of reflection surfaces. There is an issue in an image pickup apparatus using a catadioptric system, that is, a ghost is created in the acquired image by unnecessary light, which has not travelled through the reflection surfaces, incident on the image pickup surface. Japanese Patent Laid-Open No. 2004-361777 describes suppression of unnecessary light reaching an image pickup surface by applying black finishing between the refractive surface and the reflection surface. However, Japanese Patent Laid-Open No. 2004-361777 failed to consider the appropriate arrangement of the reflection surface and the image pickup surface while taking the unnecessary light into consideration; accordingly, the ghost cannot be sufficiently suppressed.

SUMMARY

The present disclosure provides an image pickup apparatus that, while being compact, can sufficiently suppress a ghost from being created.

An aspect of the disclosure is an image pickup apparatus including an optical system and an image pickup element configured to perform imaging of an object via the optical system. In the image pickup element, the optical system includes a first refractive surface having a convex shape toward an object side, a first reflection surface having a convex shape toward the object side, and a second reflection surface having a convex shape toward the object side, the first refractive surface is disposed closest to the object with respect to other refractive surfaces included in the optical system, a light flux travelling through the first refractive surface, the second reflection surface, and the first reflection surface in order from the object side towards an image side, a light receiving surface of the image pickup element is disposed at only one side with respect to the optical axis in a first cross section that includes an optical axis of the optical system, in the first cross section, when a point A is an intersection closest to the optical axis among intersections between rays traveling from the object side towards the second reflection surface and the first refractive surface, a point B is an intersection closest to the optical axis among intersections between rays traveling from the first reflection surface towards the light receiving surface and an imaginary extension surface of the second reflection surface, and a point C is an intersection between a straight connecting the point A and the point B and an imaginary extension surface of the light receiving surface, the light receiving surface is disposed at a position that is closer to the optical axis than the point C, and the following conditional expression is satisfied:

$$1.5 \le L2/L1 \le 6.5,$$

where L1 is an interval between the first reflection surface and the second reflection surface, and L2 is an interval between the first reflection surface and the light receiving surface.

Further features of the present invention will become apparent from the following description of exemplary embodiments with reference to the attached drawings.

DESCRIPTION OF THE EMBODIMENTS

Figure 1A:
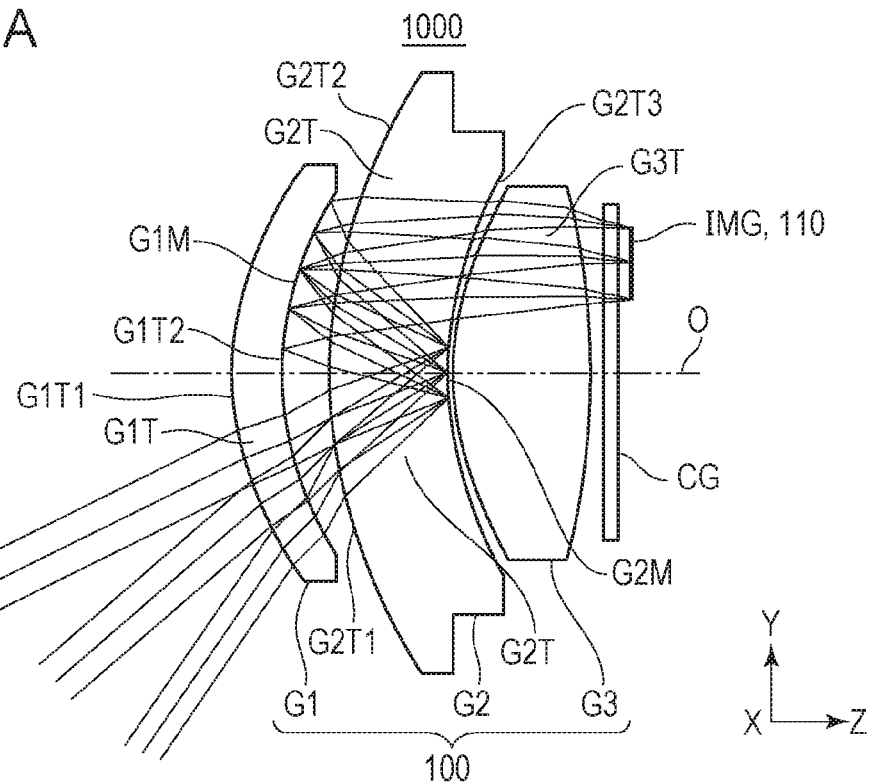
FIG. 1A is a schematic view of an essential portion in a YZ section of an image pickup apparatus according to a first example of the present disclosure.

Hereinafter, a preferred exemplary embodiment of the present disclosure will be described with reference to the drawings. Note that portions in the drawings may be depicted with scales that are different from the actual scales for convenience sake. Furthermore, in each drawing, the same members will be attached with the same reference numerals and redundant description thereof will be omitted. In the present exemplary embodiment, an "optical surface" refers to a refractive surface or a reflection surface, an "optical axis" refers to an axis that passes through centers (surface vertexes) of the optical surfaces in the optical system, and an "interval" refers to a surface interval along the optical axis.

Figure 1B:
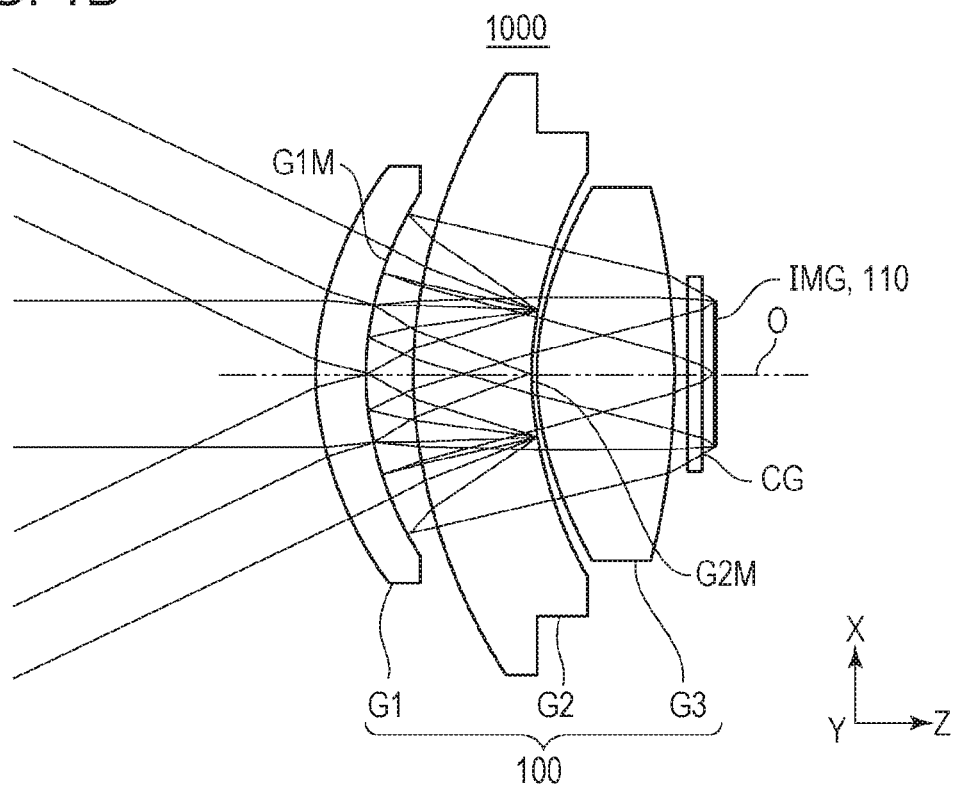
FIG. 1B is a schematic view of an essential portion of the image pickup apparatus according to the first example viewed in a Y direction.

FIG. 1A is a schematic view of an essential portion in a YZ section (a vertical section) of an image pickup apparatus 1000 according to the exemplary embodiment of the present disclosure including an optical axis O, and FIG. 1B is a schematic view of an essential portion of the image pickup apparatus 1000 viewed in a Y direction (a perpendicular direction). The image pickup apparatus 1000 includes an optical system 100 and an image pickup element 110 that performs imaging of an object (a subject) through the optical system 100. Note that in FIGS. 1A and 1B, the left side (a −Z side) in an optical axis direction (a Z direction) is an object side, and the right side (a +Z side) is an image side. Furthermore, FIG. 1B illustrates a light flux traveling towards the center of an image height.

The optical system 100 according to the present exemplary embodiment is an image forming optical system (an image pickup optical system) that forms an image of an object (not shown) by condensing a light flux from the object. The optical system 100 is a catadioptric system including a first refractive surface G1T1 that has a convex shape toward the object side, a first reflection surface G1M that has a convex shape toward the object side, and a second reflection surface G2M that has a convex shape toward the object side.

A light flux from the object side travels towards the image side in the order of the first refractive surface G1T1, the second reflection surface G2M, and the first reflection surface G1M, and forms an image plane IMG. An image pickup surface on which photoelectric conversion is performed is disposed on the image pickup element 110 at the position where the image plane IMG is situated. FIG. 1 illustrates, in the image pickup surface of the image pickup element 110, a light receiving surface that receives an effective light flux that contributes to the formation of the image of the subject. A solid image pickup element such as, for example, a CCD sensor or a CMOS sensor can be employed as the image pickup element 110.

As described above, by including the first reflection surface G1M that is a reflection surface (a concave reflection surface) having a positive power and the second reflection surface G2M that is a reflection surface (a convex reflection surface) having a negative power, the optical system 100 folds the optical path and can achieve size reduction while suppressing aberrations from occurring. In so doing, since the arrangement of the first reflection surface G1M and the second reflection surface G2M is similar to that of a Schwarzschild optical system, a bright optical system having a small aperture value (F-number) can be provided.

Furthermore, the light receiving surface of the image pickup element 110 according to the present exemplary embodiment is, in the YZ section (a first cross section) including the optical axis O, disposed only on one side (+Y side) with respect to the optical axis O. In other words, the light receiving surface of the image pickup element 110 is disposed so as to not receive, in the light flux from the optical system 100, the on-axis light that is condensed along the optical axis O and to only receive the off-axis light that is incident on the optical system 100 and that is from the opposite side (−Y side) of the light receiving surface with respect to the optical axis O. With the above, while folding the optical path with the reflection surfaces and reducing size, the image pickup element 110 can be disposed so as not to interfere with the optical system 100 and the optical path.

Figure 2:
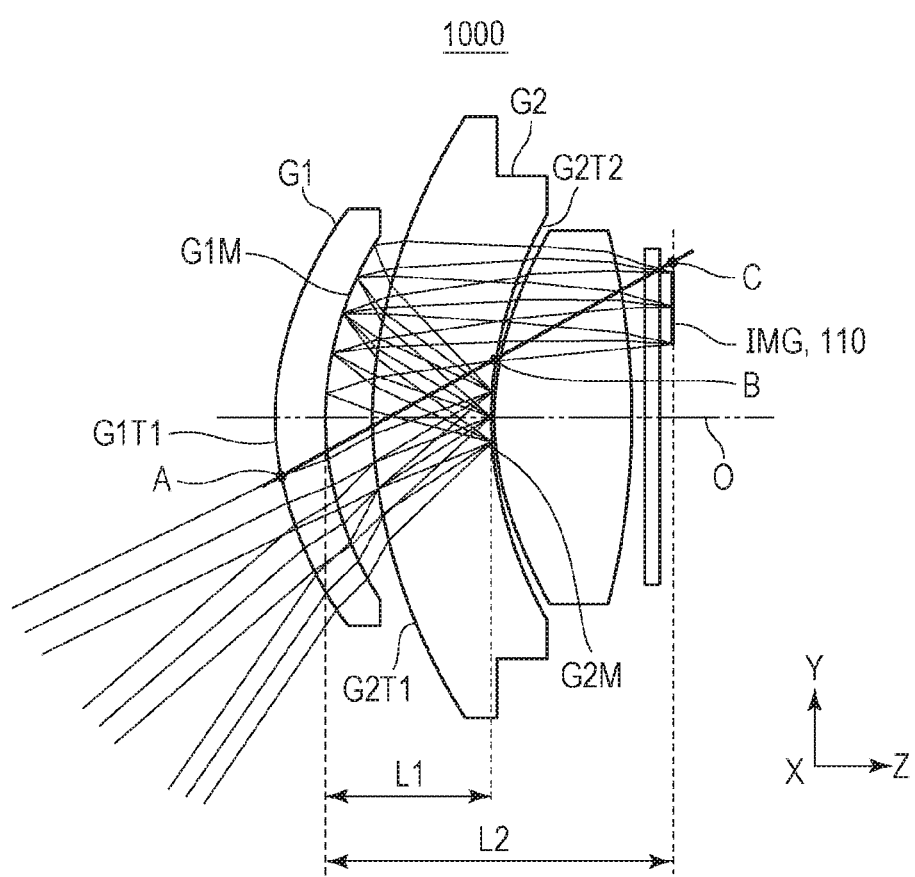
FIG. 2 is a diagram illustrating an arrangement of light receiving surfaces of the image pickup element according to the first example.

Herein, as illustrated in the YZ section in FIG. 2, point A is an intersection closest to the optical axis O among intersections between rays that travel from the object side towards the second reflection surface G2M and the first refractive surface G1T1 that is, among the refractive surfaces included in the optical system 100, disposed closest to the object. Furthermore, point B is an intersection closest to the optical axis O among intersections between rays traveling from the first reflection surface G1M towards the light receiving surface of the image pickup element 110 and an imaginary extension surface of the second reflection surface G2M, and point C is an intersection between a straight line connecting point A and point B to each other and an imaginary extension surface of the light receiving surface.

Note that the above rays are rays included in the effective light flux that reaches the light receiving surface of the image pickup element 110. Furthermore, an imaginary extension surface is an imaginary surface that is obtained by extending a surface, and an imaginary extension surface of a curved surface is a curved imaginary surface obtained by extending the curved surface in accordance with a formula defining the curved surface. The imaginary extension surface of the second reflection surface G2M is a curved imaginary surface obtained by extending the second reflection surface G2M in accordance with the formula defining the second reflection surface G2M, and coincides with a refractive surface G2T3 described later. Furthermore, the imaginary extension surface of the light receiving surface of the image pickup element 110 is a plane obtained by extending the light receiving surface.

As described above, there is an issue with an age pickup apparatus including a catadioptric system, that is, a ghost is created by unnecessary light, which has not travelled through the reflection surfaces, incident on the image pickup surface. Furthermore, creation of such a ghost becomes more noticeable as the unnecessary light incident on the optical system becomes closer to parallel to the optical axis. Accordingly, in the present exemplary embodiment, the arrangement, the shapes, and the sizes of the optical surfaces and the image pickup element 110 are appropriately set so that the light receiving surface of the image pickup element 110 is disposed at a position that is closer to the optical axis O than point C. With such a configuration, in the unnecessary light that is incident on the optical system 100 and that is traveling towards the image side from the object side without passing through the reflection surfaces, the rays that are close to parallel to the optical axis can be suppressed from reaching the light receiving surface; accordingly a creation of ghosts can be suppressed.

Note that since the unnecessary light that is closer to parallel to the optical axis than the straight line connecting point A and point B can be shielded by providing a light-shielding portion (a light absorbing member) at a portion outside of an effective region of at least one optical surface, the above unnecessary light is not an issue. For example, as described later, when a light-shielding portion is provided in the second reflection surface G2M, the unnecessary light can be shielded with the light-shielding portion. In such a case, in order to avoid interference between the ray traveling from the first reflection surface G1M towards the light receiving surface of the image pickup element 110, and the second reflection surface G2M, desirably, an edge portion of the light-shielding portion of the second reflection surface G2M on the +Y side is disposed at a position that is closer to the optical axis O than point B. Similarly, when a light-shielding portion is provided in the refractive surface G2T1, desirably, an edge portion of the light-shielding portion on the −Y side is disposed at a position that is closer to the optical axis O than point A.

In the present exemplary embodiment, it is only sufficient that the light receiving surface of the image pickup element 110 is disposed so as to satisfy the relationship described above, and the above relationship does not have to be satisfied in portions in the image pickup element 110 that do not receive the effective light flux. However, in order to reduce the overall size of the apparatus, desirably, the entirety of the image pickup element 110 is disposed so as to satisfy the above relationship.

First Example

Hereinafter, an image pickup apparatus 1000 according to a first example of the present disclosure will be described. Since the image pickup apparatus 1000 according to the present example adopts a configuration that is similar to that of the image pickup apparatus 1000 according to the exemplary embodiment described above, redundant description will be omitted.

The optical system 100 according to the present example includes a first optical element G1 that includes a refracted region G1T having a positive power, a second optical element G2 including a refracted region G2T having a negative power, and a third optical element G3 including a refracted region G3T having a positive power. Furthermore, the second reflection surface G2M provided in an image-side surface of the second optical element G2 serves as an aperture. With such a configuration, symmetry in the power arrangement of the refracted regions in front of and behind the aperture is obtained and various aberrations such as transverse chromatic aberration can be favorably corrected.

Furthermore, in the optical system 100 according to the present example, since the first optical element G1 including the concave reflection surface is a catadioptric element, aberrations can be favorably corrected while suppressing an increase in the number of optical elements and achieving decrease in the size of the entire system. Furthermore, the third optical element G3 according to the present example includes a refracted region G3T having a positive power. With the above, aberrations such as coma aberration that occur in the refractive surface G2T3 on the image side of the second optical element G2 including the second reflection surface G2M that is a convex reflection surface can be favorably corrected. Accordingly, high image forming performance can be achieved even in a small configuration in which the first optical element G1 and the second optical element G2 are catadioptric elements.

Specifically, the first optical element G1 according to the present example is a positive meniscus lens in which both the object-side surface and the image-side surface have a convex shape toward the object side, and is a catadioptric element (a catadioptric lens) including the refracted region G1T and the first reflection surface G1M. While the first reflection surface G1M according to the present example is a front surface mirror provided in the image-side surface of the first optical element G1, the first reflection surface G1M may be a back surface mirror provided in the object-side surface of the first optical element G1. However, in order to form symmetry in the number of refractions of the light flux in front of and behind the aperture described later to correct various aberrations such as transverse chromatic aberration, desirably, the first reflection surface G1M is a front surface mirror. In the first optical element G1 according to the present example, the first reflection surface G1M is disposed only on the +Y side with respect to the optical axis O.

The second optical element G2 according to the present example is a negative meniscus lens in which both the object-side surface and the image-side surface have a convex shape toward the object side, and is a catadioptric element including the refracted region G2T and the second reflection surface G2M. Furthermore, the third optical element G3 according to the present example is a biconvex lens having a positive power and is a refractive element (a refractive lens) having no reflection surface. Note that the shapes of the first optical element G1, the second optical element G2, and the third optical element G3 are not limited to those illustrated in FIGS. 1A and 1B and may be appropriately changed as required.

Furthermore, the second reflection surface G2M according to the present example includes a reflecting portion that reflects the effective light that contributes to image formation and a light-shielding portion that shields light other than the effective light, and serves as an aperture. Note that the reflecting portion includes a reflection film (an evaporated film), and the light-shielding portion includes a light absorbing member.

A light flux from an object (not shown) is incident on the refractive surface G1T1 (the first refractive surface) on the object side of the first optical element G1, transmits through a refractive surface G1T2 on the image side of the first optical element G1 and the refractive surface G2T1 on the object side of the second optical element G2, and is reflected at the reflecting portion in the second reflection surface G2M. In the above, a portion of the light flux is shielded by the light-shielding portion of the second reflection surface G2M.

The light flux that has been reflected by the reflecting portion of the second reflection surface G2M transmits through a refractive surface G2T2 on the object side of the second optical element G2, and is reflected by the first reflection surface G1M in the image-side surface of the first optical element G1. The light flux that has been reflected by the first reflection surface G1M becomes incident on the refractive surface G2T2 on the object side of the second optical element G2 again, transmits through the refractive surface G2T3 on the image side of the second optical element G2 and the refracted region G3T of the third optical element G3, and forms the image plane IMG having the planar surface shape through an optical block CG. Note that the optical block CG is an optical element that has no power, such as a cover glass or an optical filter.

As illustrated in FIG. 1B, in an X direction (a horizontal direction), the optical system 100 has a shape symmetrical about the optical axis O, and the light flux from the object side is incident on the first optical element G1 from both sides with respect to the optical axis O. In other words, ZX sections (horizontal cross sections) of the optical system 100 at various positions in the Y direction are symmetrical about the optical axis O. On the other hand, while the optical system 100 has a shape symmetrical about the optical axis O as well in the vertical section illustrated in FIG. 1A, the light flux from the object side is incident on the first optical element G1 only on the lower side (the −Y side) with respect to the optical axis O, and the image plane is formed on the upper side (the +Y side) with respect to the optical axis O. As described above, the optical system 100 adopts a configuration in which, in the vertical section, the light flux is incident on the first optical element G1 only on one side with respect to the optical axis O, in other words, the light flux is obliquely incident on the optical surfaces.

A view angle (a horizontal view angle) of the optical system 100 according to the present example in the horizontal cross section including the optical axis O is 50°. When the optical axis O is the reference (0°), the +X side is positive, and the −X side is negative, a range of an angle θx in the horizontal view angle is −25°≤θx≤+25°. Furthermore, a view angle (a vertical view angle) of the optical system 100 in the vertical section including the optical axis O is 29°. Among the rays incident on the object-side surface of the first optical element G1, when a ray (a center ray) that reaches the center of an image height is the reference (0°), the +Y side is positive, and the −Y side is negative, a range of an angle θy in the vertical view angle is −14.5°≤θy≤+14.5°. Note that the angle formed by the center ray and the optical axis O is 40°.

In the optical system 100 according to the present example, while the horizontal view angle is set on both sides of the optical axis O so as to be symmetrical about the optical axis O, the vertical view angle is set only on the −Y side with respect to the optical axis O. Furthermore, in the optical system 100, the view angle in the vertical section that is perpendicular to the horizontal cross section and that includes the optical axis is smaller than the view angle in the horizontal cross section including the optical axis. Furthermore, the optical system 100 according to the present example is a coaxial system in which all of the surface vertexes and the centers of curvature of the optical surfaces are present on the optical axis O, and is a rotationally symmetric system in which all of the optical surfaces have rotationally symmetric shapes about the optical axis O. As described above, by having the optical system 100 be a coaxial system and a rotationally symmetric system, various aberrations can be favorably corrected in each of the horizontal cross section and the vertical section.

In the present example, a medium between the first optical element G1 and the second optical element G2 is formed of a material that has a refractive index that is smaller than that of the second optical element G2. With the above, the refracting angle of the light flux refracted, with respect to the optical axis O, on the lower side of an object-side surface (the refractive surface G2T1) of the second optical element G2, and the refracting angle of the light flux refracted on the upper side can be set to similar angles, and coma aberration, transverse chromatic aberration, and distortion aberration can be favorably corrected.

Since the refractive surface G2T2 situated in a region on, with respect to the optical axis O, the upper side of the object-side surface of the second optical element G2 has a convex shape that bulges towards the light from the object side incident thereon, the light flux that passes through a position farther away from the optical axis O is refracted at a greater angle compared with the light passing through the vicinity of the optical axis O. Accordingly, the angles of the light flux incident on the refractive surface G2T2 become ununiform, and coma aberration, transverse chromatic aberration, and distortion aberration occurs. On the other hand, since the refractive surface G2T1 situated in a region on, with respect to the optical axis O, the lower side of the object-side surface of the second optical element G2 has a concave shape that is recessed with respect to the light emitting towards the first optical element G1, the light flux that passes through a position farther away from the optical axis O is refracted at a greater angle compared with the light passing through the vicinity of the optical axis O.

Note that since the second reflection surface G2M is disposed in the optical path between the refractive surface G2T1 and the refractive surface G2T2, the positions (the distances from the optical axis O, that is, whether relatively close or far from the optical axis O) of the rays in the light flux become opposite between when incident on the refractive surface G2T1 and when emitted from the refractive surface G2T2. Accordingly, the optical system 100 according to the present example can, with the refractive surface G2T1, cancel the coma aberration, the transverse chromatic aberration, and the distortion aberration that occur in the refractive surface G2T2.

In the above, in order to create a sufficient refractive index difference between the medium between the first optical element G1 and the second optical element G2, and the second optical element G2, desirably, the refractive index of the medium is small to the extent possible. In particular, it is more desirable that the medium is air, as in the present example. Note that another optical element may be disposed between the first optical element G1 and the second optical element G2 as required. However, in such a case, desirably, a medium with a small refractive index, such as air, is disposed between the first optical element G1 and the adjacent optical element.

As described above, the second reflection surface G2M according to the present example is a reflection surface having a convex shape and is provided with a function of an aperture. As described above, by having the second reflection surface G2M having a negative power function as an aperture, spherical aberration can be favorably corrected while suppressing influence on the field curvature and astigmatism. Furthermore, by having the second reflection surface G2M have a negative power, an interval between the first reflection surface G1M and the image plane IMG can be appropriately obtained, and the interference between the optical system 100 and the image pickup element can be avoided readily. Note that in the present example, by having the second reflection surface G2M be an aspherical surface, in which the power becomes smaller as the aspherical surface extends away from the optical axis O, the spherical aberration can be corrected more favorably.

Furthermore, the reflecting portion of the second reflection surface G2M according to the present example is elliptical, in which the major axis is parallel to the ZX section and the minor axis is parallel to the YZ section. In other words, a diameter of the reflecting portion of the second reflection surface G2M in the X direction (a first direction) that is perpendicular to the optical axis O and that is parallel to the horizontal plane is larger than a diameter in the Y direction (a second direction) that is perpendicular to the optical axis O of the reflecting portion and the first direction. Specifically, the aperture value of the optical system 100 according to the present example is F=1.17 in the X direction, and is F=2.8 in the Y direction.

In other words, the aperture value of the optical system 100 according to the present example is set so that the aperture value in the YZ, section, in which the view angle of the optical system 100 is asymmetrical about the optical axis O, is larger (darker) than she aperture value in the ZX section, in which the view angle of the optical system 100 is symmetrical about the optical axis O. With the above, while the brightness and the resolution in the ZX section are improved, the width of the light flux in the YZ section can be decreased; accordingly, optical path interference can be readily avoided and the degree of freedom in the arrangement of the optical surfaces can be increased. Note that the reflecting portion of the second reflection surface G2M is not limited to an elliptical shape but can be rectangular or another shape as required.

The first reflection surface G1M according to the present example mainly serves to correct the field curvature. Generally, in order to correct the field curvature in an optical system, an optical design is drafted so that the positive power and the negative power are cancelled out to reduce the Petzval sums of the optical surfaces and to form the Petzval image surface close to a plane. Conversely, in the optical system 100 according to the present example, the field curvature is corrected by appropriately setting the sag amount of the first reflection surface G1M of the first optical element G1. The above will be described in detail later.

Since the overall optical system 100 according to the present example has a positive power, when the Petzval image surface is formed near the image plane, the image tends to become warped so as to be displaced towards the object side as the image extends from the optical axis O towards the peripheral portion. Meanwhile, the first reflection surface G1M has a concave shape, in other words, the first reflection surface G1M has a shape in which the first reflection surface G1M becomes displaced towards the image side as the first reflection surface G1M extends towards the peripheral portion from the optical axis O; accordingly, the interval between the first reflection surface G1M and the image plane IMG becomes shorter as the interval extends towards the peripheral surface from the optical axis O.

Accordingly, the field of curvature of the optical system 100 can be favorably corrected by the optical path differences in the image heights created by the first reflection surface G1M. Furthermore, by having the first reflection surface G1M be an aspherical surface, the field curvature that cannot be completely corrected when the first reflection surface G1M is a spherical surface can be corrected by the aspherical component of the first reflection surface G1M. With the above, the degree of freedom in designing the sag amount of the first reflection surface G1M can be improved, and the field curvature can be corrected in a further favorable manner.

Note that typically, in order to correct the field curvature of an optical system, the aspherical surface is formed so that the power of the peripheral portion is small compared to that on the optical axis. Conversely, in the present example, different from the typical optical system, the field curvature is corrected through the sag amount of the first reflection surface G1M; accordingly, the aspherical amount of the first reflection surface G1M is set so that the power in the peripheral portion is large compared with that on the optical axis O.

In the present example, satisfactory aberration correction described above can be achieved with the refracted region G1T and the first reflection surface G1M of the first optical element G1. In the above, by providing the refracted region G1T and the first reflection surface G1M in a single optical element, compared to a case in which the refracted region G1T and the first reflection surface G1M are provided in different optical elements, an increase in the number of optical elements and an error in the relative arrangement of the optical elements can be suppressed. Furthermore, by having the first optical element G1 be a positive meniscus lens having a convex surface toward the object side, the refracted region G1T can favorably correct transverse chromatic aberration even when the optical system 100 is configured to have a wide angle.

As described above, by having a positive power, the third optical element G3 according to the present example can favorably correct various aberrations such as coma aberration that occur in the refractive surface G2T3 on the image side of the second optical element G2 including the second reflection surface G2M that is a convex reflection surface. In the above, desirably, the image-side surface of the third optical element G3 has a concave shape recessed with respect to the object side as in the present example. By having the optical surface (the final surface) disposed closest to the image in the optical system 100 be a refractive surface having a concave shape recessed with respect to the object side, the field curvature and astigmatism that were not completely corrected with the other optical surfaces can be favorably corrected. Note that the image-side surface of the third optical element G3 may, as required, have a convex shape toward the object side; however, in such a case, desirably, a refractive surface having a concave shape recessed with respect to the object side is further disposed on the image side with respect to the third optical element G3.

Specification values of the optical system 100 according to the present example are set forth in Table 1. In Table 1, R denotes a curvature radius (mm), d denotes a surface interval(distance) (mm), Nd denotes a refractive index with respect to a d-line, and νd denotes an Abbe constant with respect to the d-line. Note that the surface interval d takes a positive value when measured along the optical path and towards the image side, and takes a negative value when measured along the optical path and towards the object side. Furthermore, "E±N" means "×10±N".

TABLE 1

Surface Data (First Example)

| Surface Number | r | d | Nd | νd |
|---|---|---|---|---|
| 1 | 22.6 | 3.3 | 1.84 | 23.7 |
| 2 | 23.0 | 3.1 | | |
| 3 | 37.3 | 8.0 | 1.48 | 70.2 |
| 4 | 29.4 | 0.0 | 1.48 | 70.2 |
| 5 | 29.4 | −8.0 | 1.48 | 70.2 |
| 6 | 37.3 | −3.1 | | |
| 7 | 23.0 | 3.1 | | |
| 8 | 37.3 | 8.0 | 1.48 | 70.2 |
| 9 | 29.4 | 0.2 | | |
| 10 | 24.4 | 9.2 | 1.69 | 50.8 |
| 11 | −43.1 | 0.9 | | |
| 12 | ∞ | 1.0 | 1.51 | 64.1 |
| 13 | ∞ | 1.0 | | |

Aspherical Coefficient (First Example)

| | Surface Number | |
|---|---|---|
| | 2, 7 | 4, 5, 9 |
| Radius of Curvature | 22.98 | 29.37 |
| Conic Constant | 0.00E+00 | 0.00E+00 |
| Coefficient of Fourth-Order Term | 1.80E−05 | 2.87E−06 |
| Coefficient of Sixth-Order Term | −7.55E−08 | −2.58E−09 |
| Coefficient of Eighth-Order Term | 6.65E−10 | 5.24E−11 |
| Coefficient of Tenth-Order Term | −2.00E−12 | −9.89-14 |
| Coefficient of Twelfth-Order Term | 0.00E+00 | 0.00E+00 |
| Coefficient of Fourteenth-Order Term | 0.00E+00 | 0.00E+00 |

In the present example, the optical surface of each of the aspherical shapes has a rotationally symmetric shape about the optical axis O, expressed by the following aspherical equation.

$$z = \frac{cr^2}{1 + \sqrt{1-(1+k)c^2r^2}} + Ar^4 + Br^6 + Cr^8 + Dr^{10} + Er^{12} + Fr^{14},$$

where z is a sag amount (mm) of the aspherical shape in the optical axis direction, c is a curvature (1/mm) on the optical axis O, k is a conic constant, r is a distance (mm) from the optical axis O in a radial direction, and A to G are aspheric surface coefficients of the fourth-order term to the fourteenth-order term. In the aspherical equation described above, the first-order term denotes the sag amount of a reference spherical surface, and the curvature radius of the reference spherical surface is expressed by R=1/c. Furthermore, the terms of the second-order term and after denote the sag amount (the aspherical amount) of the aspherical component given to the reference spherical surface.

Note that in the present example, an aspheric surface coefficient of the fourth-order term to the tenth-order term are used, and in the second example, an aspheric surface coefficient of the fourth-order term to the fourteenth-order term are used; however, each of the aspheric surface coefficients may use an aspheric surface coefficient of a sixteenth-order term or a term of a higher order. Furthermore, in the present example, when the optical surface has an aspherical shape, the curvature radius of the reference spherical surface is the curvature radius of the optical surface, and the curvature radius satisfies the conditional expression described above.

As described above, in the image pickup apparatus 1000 according to the present example, the light receiving surface of the image pickup element 110 is disposed at a position that is closer to the optical axis O than point C illustrated in FIG. 2 so that the unnecessary light traveling towards the image side without passing through the reflection surfaces is prevented from reaching the light receiving surface. The imaginary extension surface of the second reflection surface G2M according to the present example coincides with the refractive surface G2T3 on the image side of the second optical element G2, and point B described above is situated on the refractive surface G2T3.

Furthermore, in the present example, in addition to the light-shielding portion of the second reflection surface G2M, the light-shielding portion is provided in the portion of the object-side surface of the third optical element G3 outside the effective region. With the above, the unnecessary light closer to parallel to the optical axis than the straight line connecting point A and point B can be sufficiently shielded. In the above, in order to avoid interference between the light-shielding portion of the third optical element G3 and the rays traveling from the first reflection surface G1M towards the light receiving surface of the image pickup element 110, desirably, the edge portion of the light-shielding portion is, on the +Y side in the YZ section, disposed at a position that is closer to the optical axis O than the straight line connecting point A and point B.

Furthermore, in order to shield the light flux that has not been completely shielded by the light-shielding portion of the second reflection surface G2M, desirably, the light-shielding portion provided in the third optical element G3 is, on the +Y side in the YZ section, larger than the second reflection surface G2M. In other words, desirably, the edge portion of the light-shielding portion of the third optical element G3 is, on the +Y side, disposed at a position farther away from the optical axis O than the edge portion of the second reflection surface G2M. Furthermore, desirably, the edge portion of the light-shielding portion of the third optical element G3 is, on the −Y side as well, disposed at a position farther away from the optical axis O than the edge portion of the second reflection surface G2M. Note that as required, the unnecessary light can be shielded by only either one of the light-shielding portions of the second reflection surface G2M and the third optical element G3.

When L1 is an interval between the first reflection surface G1M and the second reflection surface G2M, and L2 is an interval between the first reflection surface G1M and the image plane IMG (the light receiving surface of the image pickup element 110), desirably, the following conditional expression (1) is satisfied.

$$1.5 \leq L2/L1 \leq 6.5 \tag{1}$$

By satisfying conditional expression (1), occurrence of a ghost can be suppressed while suppressing the entire length of the optical system 100 from becoming large. When below the lower limit of conditional expression (1), the interval between the second reflection surface G2M and the image plane IMG becomes too small, allowing the unnecessary light to easily reach the light receiving surface of the image pickup element 110. Furthermore, when above the upper limit of conditional expression (1), the interval between the second reflection surface G2M and the image plane IMG becomes too large, making it difficult to shorten the entire length of the optical system 100. Moreover, it is more desirable that the following conditional expression (1a) is satisfied.

$$1.6 \leq L2/L1 \leq 4.0 \tag{1a}$$

Furthermore, when R1 is a curvature radius on the first reflection surface G1M, desirably, the following conditional expression (2) is satisfied.

$$1.3 \leq |R1/L1| \leq 4.0 \tag{2}$$

By satisfying conditional expression (2), while avoiding interference between the image pickup element 110 and the optical paths, the field curvature can be favorably corrected. When below the lower limit of conditional expression (2), the image pickup element 110 may interfere with the optical paths. Furthermore, when above the upper limit of conditional expression (2), the correction of the field curvature becomes insufficient and it will be difficult to obtain a satisfactory image forming performance. Moreover, it is more desirable that the following conditional expression (2a) is satisfied.

$$1.5 \leq |R1/L1| \leq 3.0 \tag{2a}$$

Furthermore, when La is an entire length of the optical system 100, and f is a focal length of the optical system 100, desirably, the following conditional expression (3) is satisfied. Note that the entire length of the optical system 100 according to the present example denotes an interval between the optical surface that is most distanced away from the image plane IMG (the light receiving surface of the image pickup element 110) in the optical axis direction (the Z direction), and the image plane IMG. In other words, in the present example, the interval between the object-side surface of the first optical element G1 and the image plane IMG is the entire length of the optical system 100.

By reducing the entire length that has been normalized with the focal distance of she optical system 100 so as to satisfy conditional expression (3), a reduction in the size of she image pickup apparatus 1000 can be achieved.

$$La/f \leq 3.0 \tag{3}$$

Furthermore, more desirably, the following conditional expression (3a) is satisfied.

$$La/f \leq 2.7 \tag{3a}$$

Values of the conditional expressions of the optical system 100 according to the present example are set forth in Table 2. Note that the focal length of the optical system 100 is f=10.8, and the values of L1, L2, R1, and La can be obtained from Table 1. As illustrated in Table 2, the optical system 100 satisfies all of the conditional expressions described above.

TABLE 2

Conditional Expression (First Example)

| | |
|---|---|
| (1) L2/L1 | 2.10 |
| (2) \|R1/L1\| | 2.03 |
| (3) La/f | 2.47 |

Figure 3:
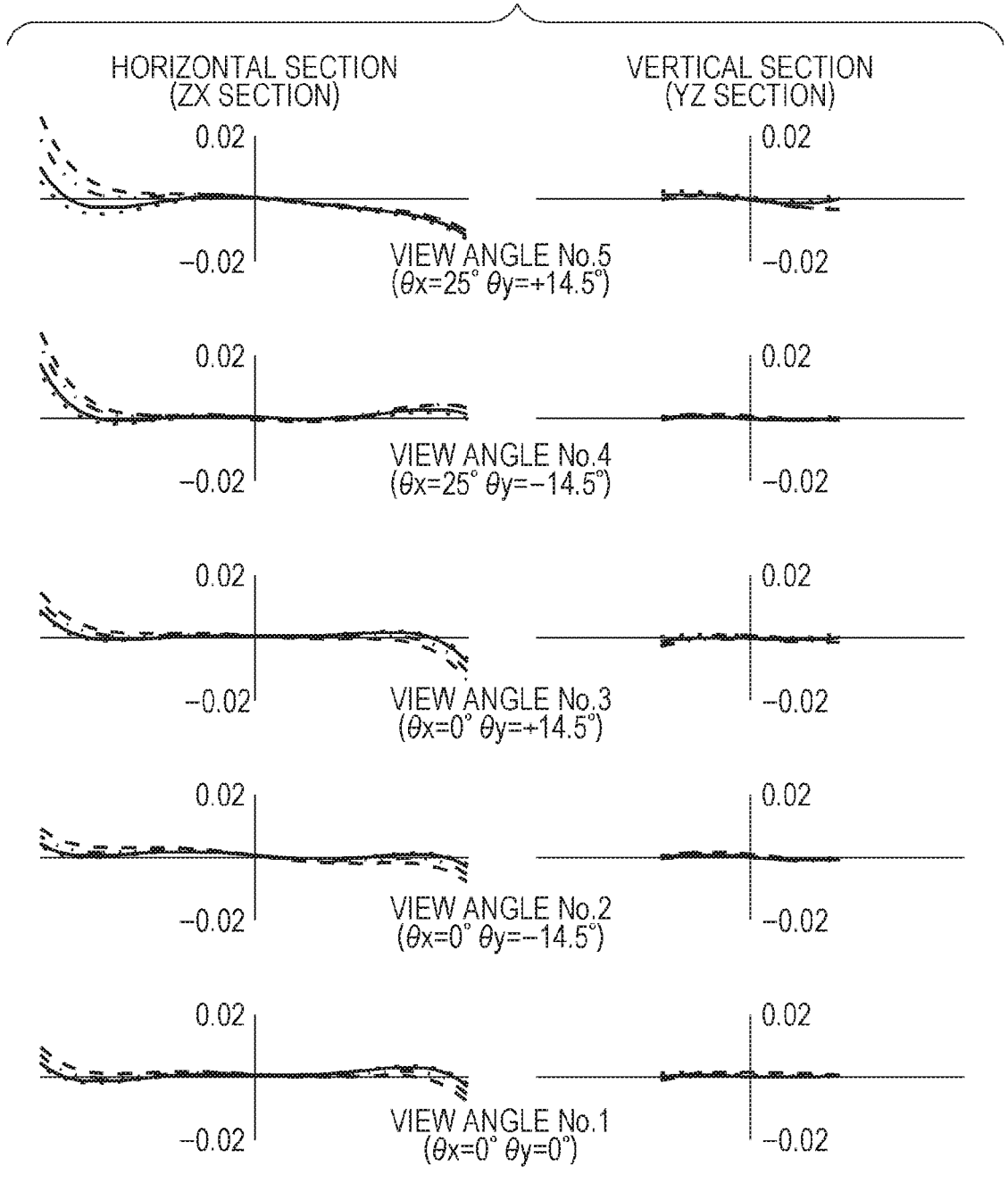
FIG. 3 illustrates transverse aberration diagrams of an optical system according to the first example.

FIG. 3 illustrates transverse aberration diagrams of the optical system 100 according to the present example. FIG. 3 illustrates traverse aberrations of C-line (wavelength 656.3 nm), d-line (wavelength 587.6 nm), F-line (wavelength 486.1 nm), and g-line (wavelength 435.8 nm) in five view angles of the optical system 100, and the unit of each numerical value is millimeters. As it can be understood through FIG. 3, the coma aberrations and the transverse chromatic aberrations are favorably corrected. Furthermore, since the aperture ratio (vignetting) of the optical system 100 is 100% in the total angle of view, eclipsing due to the second reflection surface G2M does not occur and an optical system bright from the on-axis to the off-axis can be provided.

Second Example

Hereinafter, an image pickup apparatus 2000 according to a second example of the present disclosure will be described. In the image pickup apparatus 2000 according to the present example, description of configurations similar to those of the image pickup apparatus 1000 of the first example described above will be omitted.

Figure 4A:
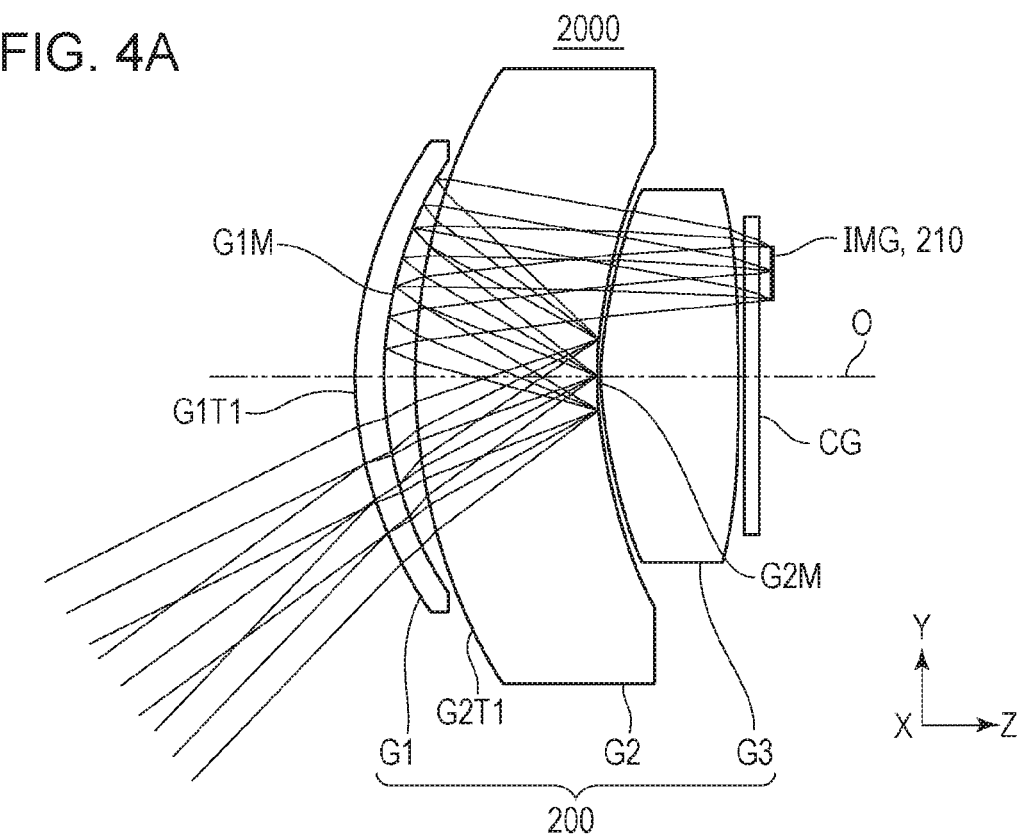
FIG. 4A is a schematic view of an essential portion in a YZ section of an image pickup apparatus according to a second example of the present disclosure.
Figure 4B:
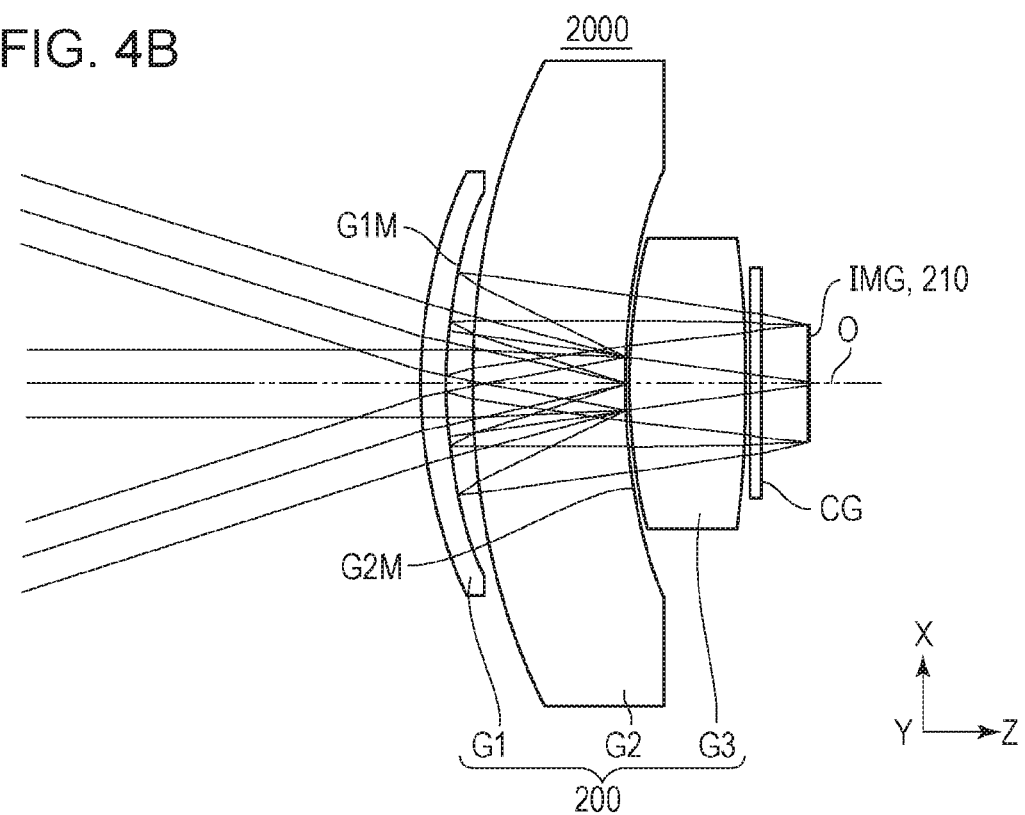
FIG. 4B is a schematic view of an essential portion of the image pickup apparatus according to the second example of the present disclosure viewed in a Y direction.

FIG. 4A is a schematic view of an essential portion in the YZ section of the image pickup apparatus 2000 according to the present example including the optical axis O, and FIG. 4B is a schematic view of the essential portion of the image pickup apparatus 2000 viewed in the Y direction. The difference between an optical system 200 according to the present example and the optical system 100 according to the first example are the shapes and the materials of the optical elements.

Specification values of the optical system 200 according to the present example are set forth in Table 3.

TABLE 3

Surface Data (Second Example)

| Surface Number | r | d | Nd | vd |
|---|---|---|---|---|
| 1 | 24.9 | 2.0 | 1.85 | 22.7 |
| 2 | 25.6 | 2.1 | | |
| 3 | 38.7 | 11.9 | 1.51 | 64.2 |
| 4 | 31.2 | 0.0 | 1.51 | 64.2 |
| 5 | 31.2 | −11.9 | 1.51 | 64.2 |
| 6 | 38.7 | −2.1 | | |
| 7 | 25.6 | 2.1 | | |
| 8 | 38.7 | 11.9 | 1.51 | 64.2 |
| 9 | 31.2 | 0.2 | | |
| 10 | 29.4 | 9.1 | 1.67 | 55.3 |
| 11 | −64.8 | 0.3 | | |
| 12 | ∞ | 1.0 | 1.51 | 64.1 |
| 13 | ∞ | 1.0 | | |

Aspherical Coefficient (Second Example)

TABLE 3-continued

| | Surface Number | |
|---|---|---|
| | 2, 7 | 4, 5, 9 |
| Radius of Curvature | 31.20 | 25.60 |
| Conic Constant | 0 | −0.50699 |
| Coefficient of Fourth-Order Term | 1.29E−05 | 4.98E−06 |
| Coefficient of Sixth-Order Term | 5.93E−09 | 2.11E−08 |
| Coefficient of Eighth-Order Term | 1.05E−10 | −1.24E−10 |
| Coefficient of Tenth-Order Term | −4.88E−13 | 7.20E−13 |
| Coefficient of Twelfth-Order Term | | −1.97E−15 |
| Coefficient of Fourteenth-Order Term | | 2.29E−18 |

Figure 5:
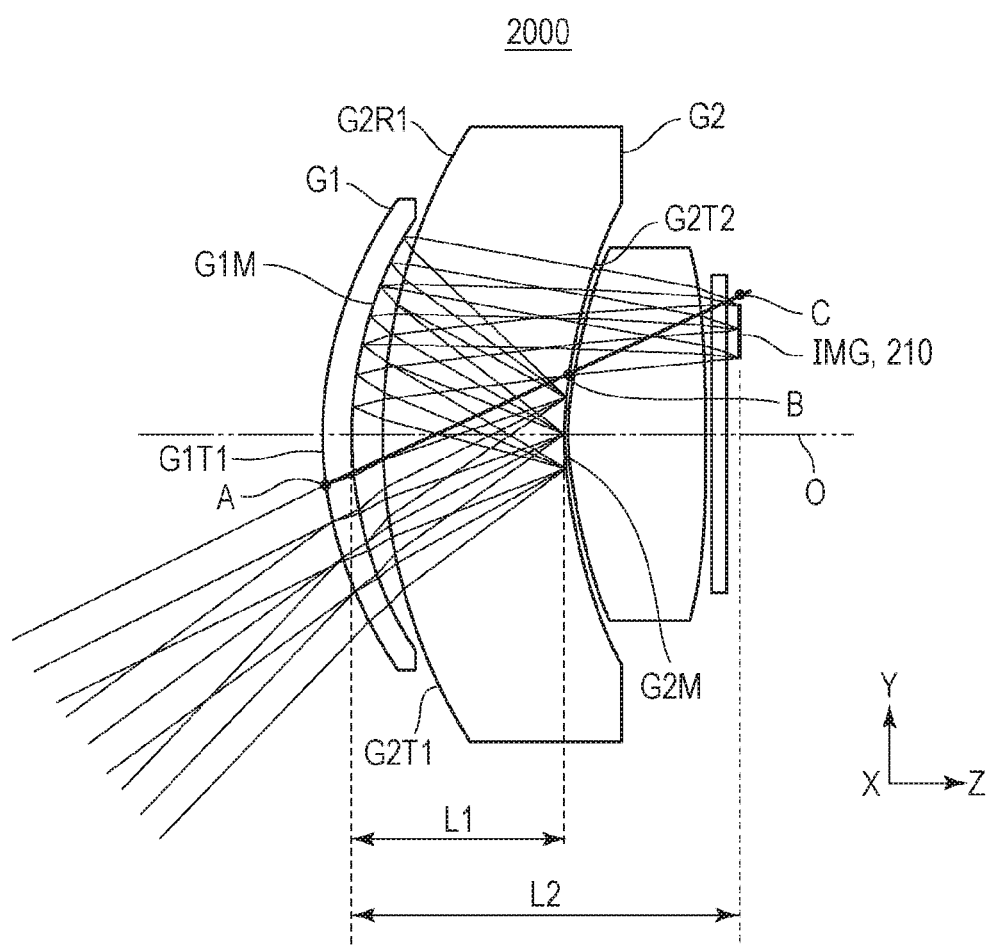
FIG. 5 is a diagram illustrating an arrangement of light receiving surfaces of the image pickup element according to the second example.

As illustrated in FIG. 5, in the image pickup apparatus 2000 according to the present example as well, similar to the image pickup apparatus 1000 according to the first example, by disposing a light receiving surface of an image pickup element 210 at a position closer to the optical axis O than point C, unnecessary light is suppressed from reaching the light receiving surface. Furthermore, in the optical system 200 according to the present example, the view angle in the ZX section is 35°, the view angle in the YZ section is 20°, the focal length is f=11.2 mm, the aperture value in the X direction is 1.17, and the aperture value in the Y direction is 2.8, Furthermore, as illustrated in Table 4 below, the optical system 200 according to the present example satisfies the conditional expressions described above.

TABLE 4

Conditiona Expression (Second Example)

| | |
|---|---|
| (1) L2/L1 | 1.83 |
| (2) R1/\|L1\| | 1.82 |
| (3) La/f | 2.47 |

Figure 6:
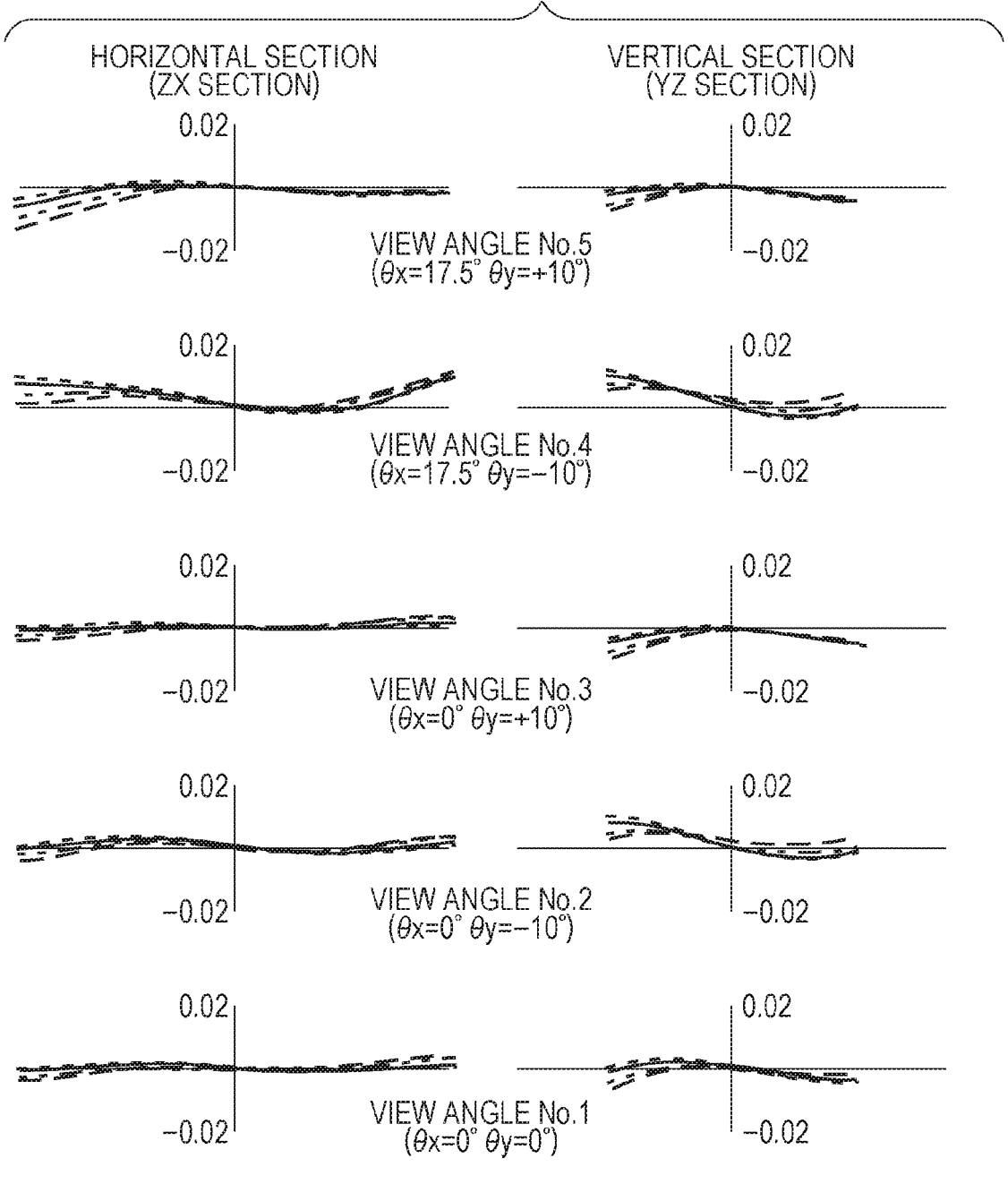
FIG. 6 illustrates transverse aberration diagrams of an optical system according to the second example.

FIG. 6 illustrates transverse aberration diagrams of the optical system 200 according to the present example. As it can be understood through FIG. 6, the coma aberrations and the transverse chromatic aberrations are favorably corrected. Furthermore, since the aperture ratio of the optical system 200 is 100% in the total angle of view, an optical system bright from the on-axis to the off-axis can be provided.

On-Board System

Figure 7:
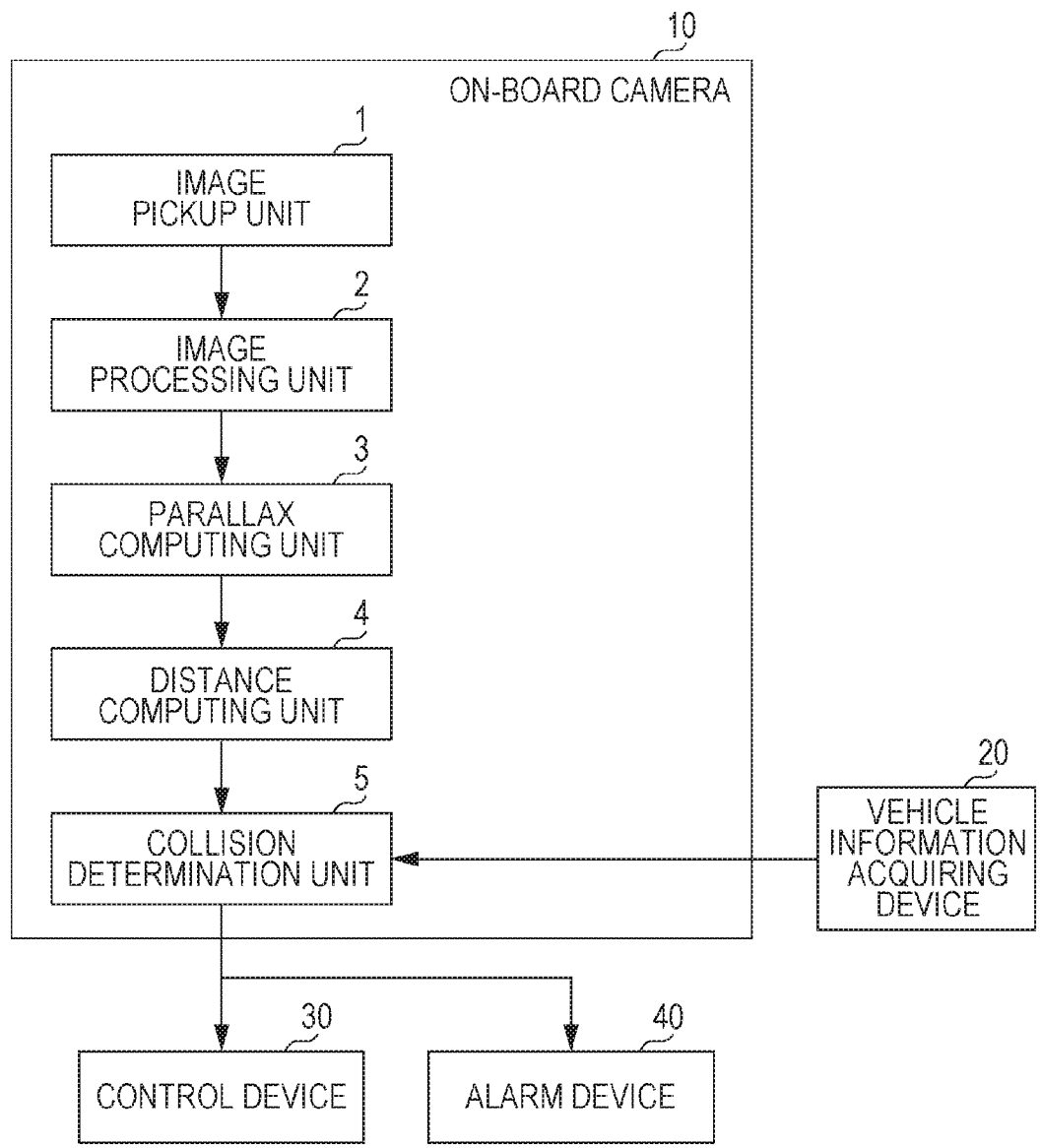
FIG. 7 is a functional block diagram of an on-board system according to an exemplary embodiment of the present disclosure.
Figure 8:
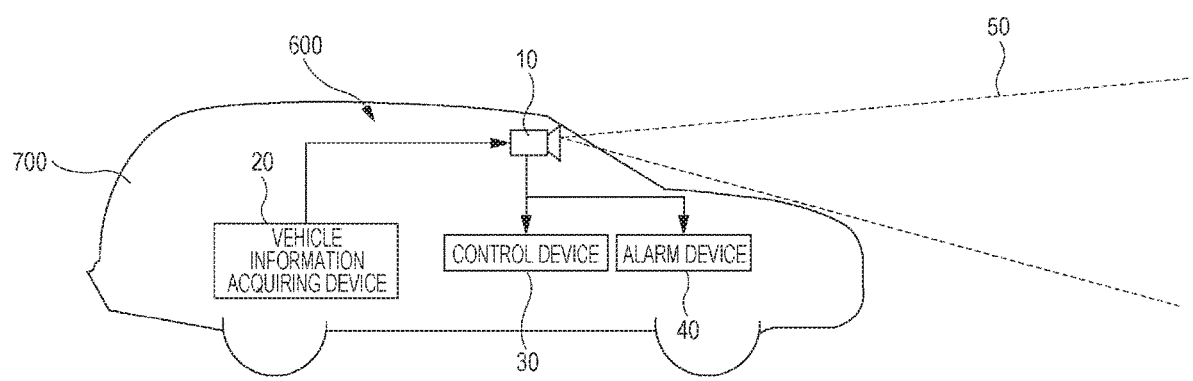
FIG. 8 is a schematic view of an essential portion of a vehicle according to an exemplary embodiment.

FIG. 7 is a block diagram of an on-board camera 10 according to the present exemplary embodiment and an on-board system (a driving support apparatus) 600 including the on-board camera 10. The on-board system 600 is held by a movable moving member (moving device) such as an automobile (a vehicle), and is an apparatus that supports driving of the vehicle on the basis of image information of the circumference of the vehicle acquired by the on-board camera 10. FIG. 8 is a schematic view of a vehicle 700 provided with the on-board system 600. While a case in which an image pickup area 50 of the on-board camera 10 is set to the front of the vehicle 700 is illustrated in FIG. 8, the image pickup area 50 may be set to behind or the lateral side of the vehicle 700.

As illustrated in FIG. 7, the on-board system 600 includes the on-board camera 10, a vehicle information acquiring device 20, a control device (an electronic control unit or an ECU) 30, and an alarm device 40. Furthermore, the on-board camera 10 includes an image pickup unit 1, an image processing unit 2, a parallax computing unit 3, a distance computing unit (an acquiring unit) 4, and a collision determination unit 5. A processing unit is constituted by the image processing unit 2, the parallax computing unit 3, the distance computing unit 4, and the collision determination unit 5. The image pickup unit 1 is the image pickup apparatus according to either of the examples described above and employs an image pickup surface phase difference detector as the image pickup element.

Figure 9:
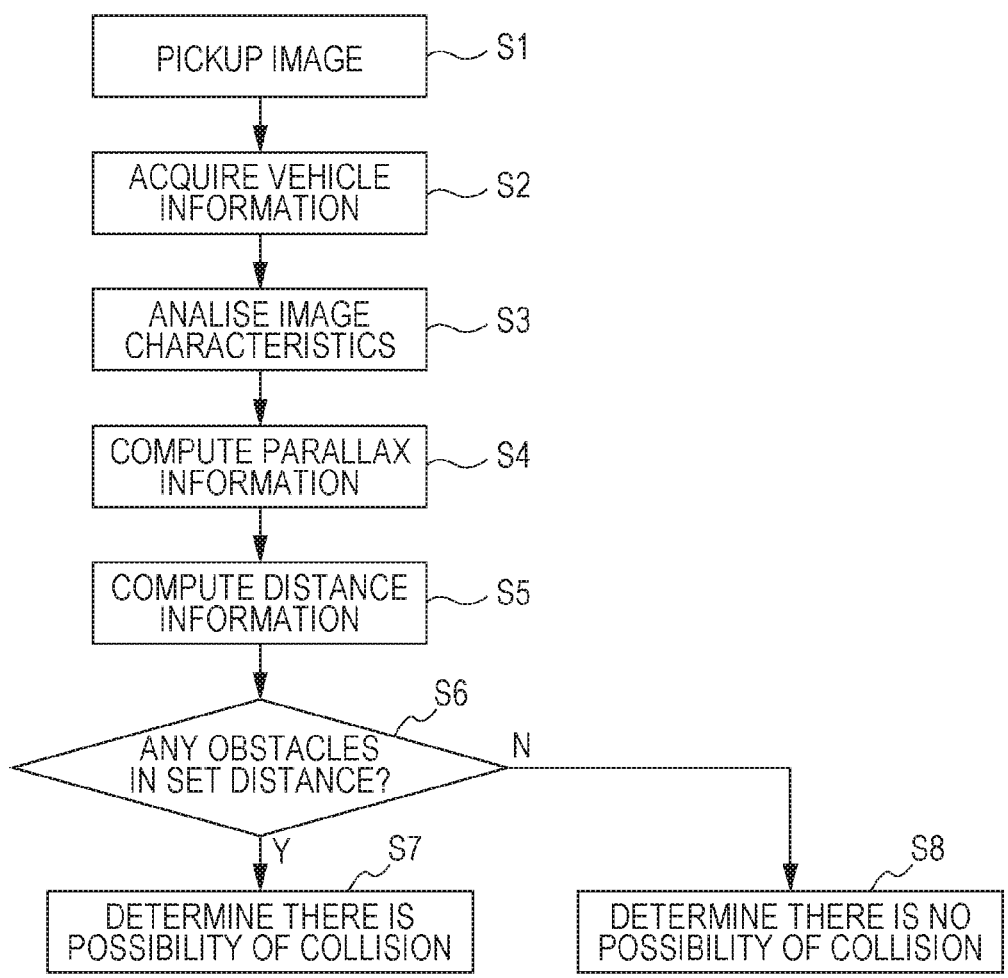
FIG. 9 is a flowchart illustrating an example of an operation of an on-board system according to an exemplary embodiment.

FIG. 9 is a flowchart illustrating an example of an operation of the on-board system 600 according to the present exemplary embodiment. Hereinafter, the operation of the on-board system 600 will be described in accordance with the flowchart.

In step S1, first, imaging of an imaging target (subject) around the vehicle is performed using the image pickup unit 1, and a plurality of image data (parallax image data) are acquired.

Furthermore, in step S2, vehicle information is acquired from the vehicle information acquiring device 20. The vehicle information is information including the vehicle speed, the yaw rate, the steering angle, and the like.

In step S3, image processing is performed with the image processing unit 2 on the plurality of image data acquired with the image pickup unit 1. Specifically, image characteristic analysis that analyses the feature values, such as the amount and direction of the edge and the density value in the image data, is performed. Note that the image characteristic analysis may be performed on each of the plurality of image data, or may be performed on some of the image data in the plurality of image data.

In step S4, information on parallax (image shift) between the plurality of image data acquired with the image pickup unit 1 is computed with the parallax computing unit 3. As for the method of computing the parallax information, known methods such as an SSDA method and an area correlation method can be used; accordingly, description thereof is omitted in the present exemplary embodiment. Note that steps S2, S3, and S4 may be processed in the above described order or may be processed in a parallel manner.

In step S5, information on the distance to the imaging target that has been imaged with the image pickup unit 1 is computed with the distance computing unit 4. The distance information can be computed based on the parallax information computed with the parallax computing unit 3, and an internal parameter and an external parameter of the image pickup unit 1. Note that the distance information herein is information on the relative position with respect to the imaging target, such as the distance to the imaging target, a defocus amount, and an amount of image shift. The distance information may be information directly expressing the distance value of the imaging target inside the image or may be information indirectly expressing information corresponding to the distance value.

Furthermore, in step S6, the collision determination unit 5 determines whether the distance information computed by the distance computing unit 4 is within the range of a set distance set in advance. With the above, determination of whether there is an obstacle around the vehicle within the set distance is made; accordingly, the possibility of a collision between the vehicle and an obstacle can be determined. When there is an obstacle within the set distance, the collision determination unit 5 determines that there is a possibility of a collision (step S7), and when there is no obstacle within the set distance, determines that there is no possibility of a collision (step S8).

Subsequently, when determined that there is a possibility of a collision (step S7), the collision determination unit 5 notifies the determination result to the control device 30 and the alarm device 40. In so doing, the control device 30 controls the vehicle on the basis of the determination result determined by the collision determination unit 5, and the alarm device 40 alarms the driver on the basis of the determination result determined by the collision determination unit 5. Note that it is only sufficient that the notification of the determination result is made to at least either one of the control device 30 and the alarm device 40.

For example, the control device 30 performs control of the vehicle such as, for example, actuating the brakes, releasing the accelerator, suppressing output of an engine or a motor by generating a control signal that generates braking force in each of the wheels. Furthermore, the alarm device 40 alarms the user (the driver) of the vehicle by, for example, sending out a warning sound, displaying an alarm information on a screen of a car navigation system or the like, and generating vibration in the seat belt or the steering wheel.

As described above, the on-board system 600 according to the present exemplary embodiment is capable of effectively detecting an obstacle and avoiding collision between the vehicle and the obstacle through the process described above. In particular, by applying the optical system according to each example described above to the on-board system 600, a detection of an obstacle and a collision determination can be performed in a wide view angle while reducing the overall size of the on-board camera 10 and increasing the degree of freedom of arrangement.

Note that in the present exemplary embodiment, while a configuration in which the on-board camera 10 includes a single image pickup unit 1 that includes the image pickup surface phase difference detector has been described, not limited to the above, the on-board camera 10 may adopt a stereoscopic camera that includes two image pickup units. In such a case, processing similar to the above can be performed without using the image pickup surface phase difference detector by acquiring image data at the same time with each of the two image pickup units that are synchronized to each other and by using the two image data. Note that when the difference in the imaging times between the two image pickup units is known, the two image pickup units do not have to be synchronized.

Note that many exemplary embodiments that computes the distance information can be conceived. As an example of an image pickup element that includes the image pickup unit 1, a case in which a pupil division image pickup element that includes a plurality of pixel portions regularly arranged in a two-dimensional manner in an array will be described. In the pupil division image pickup element, a single pixel portion includes a microlens and a plurality of photoelectric conversion unit, and a pair of light flux that pass different areas in the pupil of the optical system are received so that a pair of image data can be output from each photoelectric conversion unit.

Subsequently, the image shift amount in each region is computed with correlation calculation between the pair of image data, and a map data of the image shift showing distribution of the image shift amount is computed with the distance computing unit 4. Alternatively, the distance computing unit 4 may convert the image shift amount into a defocus amount, and a defocus map data showing the distribution of the defocus amount (the distribution of the imaging image on a two-dimensional plane) may be generated. Furthermore, the distance computing unit 4 may acquire a distance map data that is a map data of the distance to the imaging target that is converted from the defocus amount.

Note that in the present exemplary embodiment, while the on-board system 600 is used for driving support (collision damage reduction), not limited to the above, the on-board system 600 may be used for cruise control (including all-vehicle-speed following function) and for automatic driving. Furthermore, the on-board system 600 is not limited to automobiles or the like, and can be used in moving members (moving devices) such as, for example, a ship, an aircraft, and an industrial robot. Furthermore, not limited to a moving member, the on-board camera 10 according to the present exemplary embodiment can be used in various devices that uses object recognition, such as an intelligent transport system (ITS).

Distance Measuring Device

A case in which the image pickup apparatus according to each example described above is used in a distance measuring device of an on-board camera or the like will be described in detail next.

As described above, the vertical view angle of the optical system according to each example is only set on one side with respect to the optical axis O. Accordingly, in a case in which the optical system is used in the on-board camera 10 and the on-board camera 10 is installed in the vehicle, desirably, the optical axis O of the optical system is set unparallel to the horizontal direction in accordance with the position of the subject. For example, in a case in which the optical system according to each example described above is used as a distance measuring optical system, the optical axis O is to be tilted upwards with respect to the horizontal direction so that the center of the vertical view angle approaches the horizontal direction. Note that the optical axis O may be set so as to be tilted downwards with respect to the horizontal direction after rotating (flipping upside down) the optical systems 180° about the X axis. With the above, the image pickup area of the on-board camera 10 can be set appropriately.

However, in the optical system in each example, the image forming performance is the highest at the on-axis and, conversely, the image forming performance at the marginal angle is lower; accordingly, more desirably, the light flux from the subject that has been focused passes near the on-axis of the optical system. For example, in a case in which the on-board camera 10 needs to focus on a sign or an obstacle on the road, desirably, the image forming performance is, with respect to the horizontal direction, increased in the view angle on the lower side (the earth side) than in the upper side (sky side). In so doing, when the optical system according to each example is used, as described above, it is only sufficient that the optical system is flipped upside down and the optical axis O is tilted downwards with respect to the horizontal direction, so that the view angle close to the optical axis O is oriented downwards.

Figure 10:
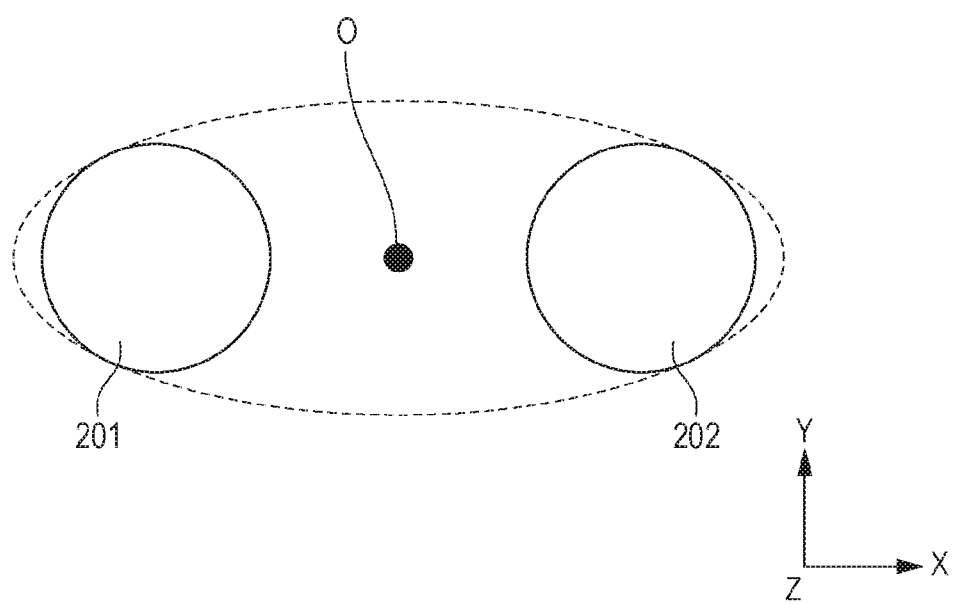
FIG. 10 is a schematic view of an essential portion of reflecting portions of a distance measuring optical system according to an exemplary embodiment of the present disclosure.

FIG. 10 is a schematic view of an essential portion of the reflecting portion of the second reflection surface G2M viewed from the −Z side in the Z direction, in a case in which the optical system according to each example is used as the distance measuring optical system. In FIG. 10, the solid lines indicate the reflecting portions in the second reflection surface G2M of the distance measuring optical system, and the broken line indicates the reflecting portion in the second reflection surface G2M of each of the optical systems 100 and 200 according to the first and second examples.

As illustrated in FIG. 10, the second reflection surface G2M of the distance measuring optical system is provided with two reflecting portions 201 and 202 that are decentered in the X direction with respect to the optical axis O. The two reflecting portions 201 and 202 can divide the pupil of the distance measuring optical system. The reflecting portions 201 and 202 are, similar to each example, formed of a reflection film. Note that the aperture values of each of the reflecting portions 201 and 202 of the distance measuring optical system are both 2.8 in the X direction and the Y direction.

In a case in which a distance measuring optical system that divides the pupil is used, an image pickup element that can perform photoelectric conversion while differentiating the image of the subject formed by the light flux that has passed the reflecting portion 201 and the image of the subject formed by the light flux that has passed the reflecting portion 202 is used as the image pickup element disposed on the image plane. The distance measuring device of an on-board camera or the like can be constituted by such an image pickup element, the distance measuring optical system, and the processing unit described above.

When the subject is on the front-side focal plane of the distance measuring optical system, positional deviation does not, in the image plane of the distance measuring optical system, occur in the image with the two divided light fluxes. However, when the subject is at a position other than the front-side focal plane of the distance measuring optical system, positional deviation occurs in the image with the two divided light fluxes. In the above, since the positional deviation of the image formed by the light fluxes corresponds to the amount of displacement of the subject from the front-side focal plane, the distance to the subject can be measured by acquiring the amount of positional deviation of the image formed by the light fluxes and the direction of the positional deviation.

Furthermore, by configuring the optical elements of the distance measuring optical system in a similar manner to that of the examples, various aberrations can be favorably corrected and a high distance measuring accuracy can be achieved. In the above, since the aperture ratio of the distance measuring optical system is 100% in the total angle of view, by using the distance measuring optical system in the distance measuring device, a stable distance measuring accuracy can be obtained in the total angle of view.

Note that while in the distance measuring optical system, the two reflecting portions are decentered in the X direction, the two reflecting portions may be decentered in the Y direction as required. However, in order to improve the distance measuring accuracy, desirably, the two reflecting portions are decentered in the X direction. The above is because, in the optical systems 100 and 200 described above in which two reflecting portions are used, the aperture value in the X direction that is symmetric about the optical axis O is smaller than the aperture value in the Y direction that is asymmetric about the optical axis O.

MODIFICATION EXAMPLES

While the preferable exemplary embodiments and examples of the present disclosure have been described above, the present disclosure is not limited to the exemplary embodiments and the examples and may be combined, deformed, and modified within the gist of the present disclosure.

For example, in the examples, the catadioptric element including both the first reflection surface G1M and the refracted region G1T is used as the first optical element G1; however, a reflective element (a mirror) including only the first reflection surface G1M may be used as the first optical element G1. Furthermore, while the optical system of each example included the third optical element G3, a configuration constituted by the first optical element G1 and the second optical element G2 may be adopted. In such a case, a prism including a plurality of optical surfaces in which the object-side surface and the image-side surface have different curvature radius may be used as the second optical element G2. With the above, compared with the optical system according to each example, the number of optical elements can be reduced while obtaining a satisfactory image forming performance.

Furthermore, as in the second example, even in a case in which the second reflection surface G2M includes two reflecting portions, desirably, the diameters of the effective regions in the X direction are set larger than the diameters in the Y direction. In other words, the distance between the edge portions of the two reflecting portions the X direction that are farthest away from each other is, desirably, set larger than the largest diameter of the two reflecting portions in the Y direction. With the above, similar to the first example, while improving the brightness and resolution in the ZX section, the optical path interference in the YZ section can be readily avoided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-230829, filed Nov. 30, 2017, which is hereby incorporated by reference herein in its entirety.

What is claimed is:

1. An image pickup apparatus comprising:
   an optical system; and
   an image pickup element configured to perform imaging of an object via the optical system,
   wherein the optical system includes,
      a first refractive surface having a convex shape toward an object side,
      a first reflection surface having a convex shape toward the object side, and
      a second reflection surface having a convex shape toward the object side,
   wherein the first refractive surface is disposed closest to the object with respect to other refractive surfaces included in the optical system,
   wherein a light flux travelling through the first refractive surface, the second reflection surface, and the first reflection surface in order from the object side towards an image side,
   wherein a light receiving surface of the image pickup element is disposed at only one side with respect to an optical axis of the optical system in a first cross section that includes the optical axis,
   wherein in the first cross section, when a point A is an intersection closest to the optical axis among intersections between rays traveling from the object side towards the second reflection surface and the first refractive surface, a point B is an intersection closest to the optical axis among intersections between rays traveling from the first reflection surface towards the light receiving surface and an imaginary extension surface of the second reflection surface, and a point C is an intersection between a straight line connecting the point A and the point B and an imaginary extension surface of the light receiving surface, the light receiving surface is disposed at a position that is closer to the optical axis than the point C, and
   wherein the following conditional expression is satisfied:

$1.5 \le L2/L1 \le 6.5$, where L1 is an interval between the first reflection surface and the second reflection surface, and L2 is an interval between the first reflection surface and the light receiving surface.

2. The image pickup apparatus according to claim 1, further comprising:
   a first optical element that includes the first refractive surface and the first reflection surface.

3. The image pickup apparatus according to claim 1, wherein in the first cross section, the image pickup element is disposed at a position, on the one side, that is closer to the optical axis than the point C.

4. The image pickup apparatus according to claim 1, wherein the second reflection surface includes a light-shielding portion that shields a portion of the light flux from the object side.

5. The image pickup apparatus according to claim 4, wherein on the one side in the first cross section, an edge portion of the light-shielding portion is disposed at a position closer to the optical axis than the point B.

6. The image pickup apparatus according to claim 4, wherein the following conditional expression is satisfied:

$1.3 \le |R1/L1| \le 4.0$, where L1 is an interval between the first reflection surface and the second reflection surface, and R1 is a curvature radius of the first reflection surface.

7. The image pickup apparatus according to claim 1, wherein the following conditional expression is satisfied:

$La/f \le 3.0$, where La is an entire length of the optical system, and f is a focal length of the optical system.

8. The image pickup apparatus according to claim 1, wherein the first refractive surface, the first reflection surface, and the second reflection surface are rotationally symmetric about the optical axis.

9. The image pickup apparatus according to claim 1, wherein center of curvatures of the first refractive surface, the first reflection surface, and the second reflection surface are situated on the optical axis.

10. The image pickup apparatus according to claim 2, wherein the optical system includes a second optical element that includes the second reflection surface.

11. The image pickup apparatus according to claim 10, wherein the optical system includes a third optical element disposed on the image side with respect to the second optical element.

12. The image pickup apparatus according to claim 11, wherein an object-side surface of the third optical element includes a light-shielding portion that shields a light flux that is incident thereon and that has not passed through the second reflection surface.

13. The image pickup apparatus according to claim 12, wherein on the one side in the first cross section, an edge portion of the light-shielding portion of the third optical element is disposed at a position closer to the optical axis than the straight line connecting the point A and the point B.

14. The image pickup apparatus according to claim 12, wherein on the one side in the first cross section, an edge portion of the light-shielding portion of the third optical element is disposed at a position farther away from the optical axis than an edge portion of the second reflection surface.

15. The image pickup apparatus according to claim 1 further comprising:

an acquiring unit that acquires distance information on a distance to an object based on image data of the object acquired with the image pickup element.

16. An on-board system comprising:
an optical system;
an image pickup element configured to perform imaging of an object via the optical system;
an acquiring unit that acquires distance information on a distance to an object based on image data of the object acquired with the image pickup element; and
a collision determination unit that determines a possibility of a collision between a vehicle and an object on a basis of the distance information,
wherein the optical system includes,
a first refractive surface having a convex shape toward an object side,
a first reflection surface having a convex shape toward the object side, and
a second reflection surface having a convex shape toward the object side,
wherein the first refractive surface is disposed closest to the object with respect to other refractive surfaces included in the optical system,
wherein a light flux travelling through the first refractive surface, the second reflection surface, and the first reflection surface in order from the object side towards an image side,
wherein a light receiving surface of the image pickup element is disposed at only one side with respect to an optical axis of the optical system in a first cross section that includes the optical axis,
wherein in the first cross section, when a point A is an intersection closest to the optical axis among intersections between rays traveling from the object side towards the second reflection surface and the first refractive surface, a point B is an intersection closest to the optical axis among intersections between rays traveling from the first reflection surface towards the light receiving surface and an imaginary extension surface of the second reflection surface, and a point C is an intersection between a straight line connecting the point A and the point B and an imaginary extension surface of the light receiving surface, the light receiving surface is disposed at a position that is closer to the optical axis than the point C, and
wherein the following conditional expression is satisfied:

$1.5 \leq L2/L1 \leq 6.5$, where L1 is an interval between the first reflection surface and the second reflection surface, and L2 is an interval between the first reflection surface and the light receiving surface.

17. The on-board system according to claim 16, further comprising:

a control device that outputs a control signal that generates braking force in wheels of the vehicle when determined that there is a possibility of a collision between the vehicle and the object.

18. The on-board system according to claim 16, further comprising:
an alarm device that alarms a driver of the vehicle when determined that there is a possibility of a collision between the vehicle and the object.

19. A moving device comprising:
an optical system;
an image pickup element configured to perform imaging of an object via the optical system;
wherein the moving device is configured to hold the optical system and the image pickup element and is movable,
wherein the optical system includes,
a first refractive surface having a convex shape toward an object side,
a first reflection surface having a convex shape toward the object side, and
a second reflection surface having a convex shape toward the object side,
wherein the first refractive surface is disposed closest to the object with respect to other refractive surfaces included in the optical system,
wherein a light flux travelling through the first refractive surface, the second reflection surface, and the first reflection surface in order from the object side towards an image side,
wherein a light receiving surface of the image pickup element is disposed at only one side with respect to an optical axis of the optical system in a first cross section that includes the optical axis,
wherein in the first cross section, when a point A is an intersection closest to the optical axis among intersections between rays traveling from the object side towards the second reflection surface and the first refractive surface, a point B is an intersection closest to the optical axis among intersections between rays traveling from the first reflection surface towards the light receiving surface and an imaginary extension surface of the second reflection surface, and a point C is an intersection between a straight line connecting the point A and the point B and an imaginary extension surface of the light receiving surface, the light receiving surface is disposed at a position that is closer to the optical axis than the point C, and
wherein the following conditional expression is satisfied:

$1.5 \leq L2/L1 \leq 6.5$, where L1 is an interval between the first reflection surface and the second reflection surface, and L2 is an interval between the first reflection surface and the light receiving surface.

* * * * *